March 31, 1931. W. N. VANCE ET AL 1,798,182
BOLTLESS STRUCTURE
Filed June 20, 1929 6 Sheets-Sheet 2
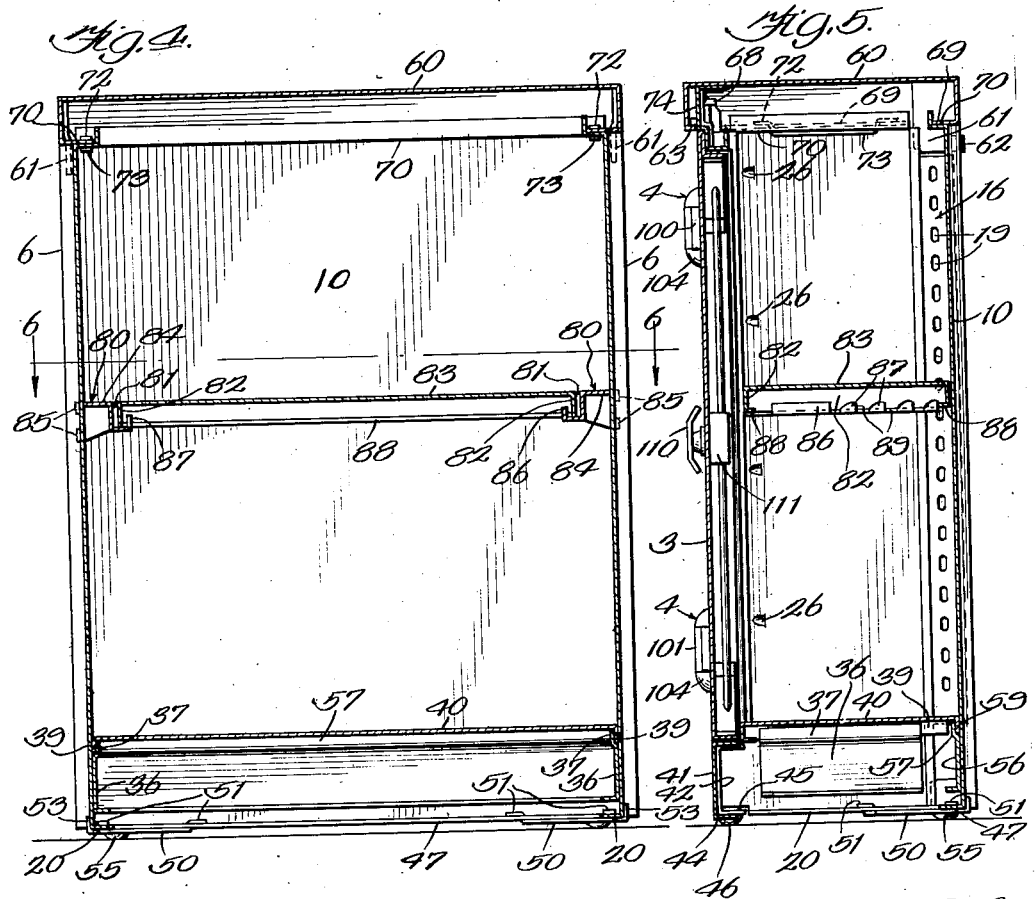
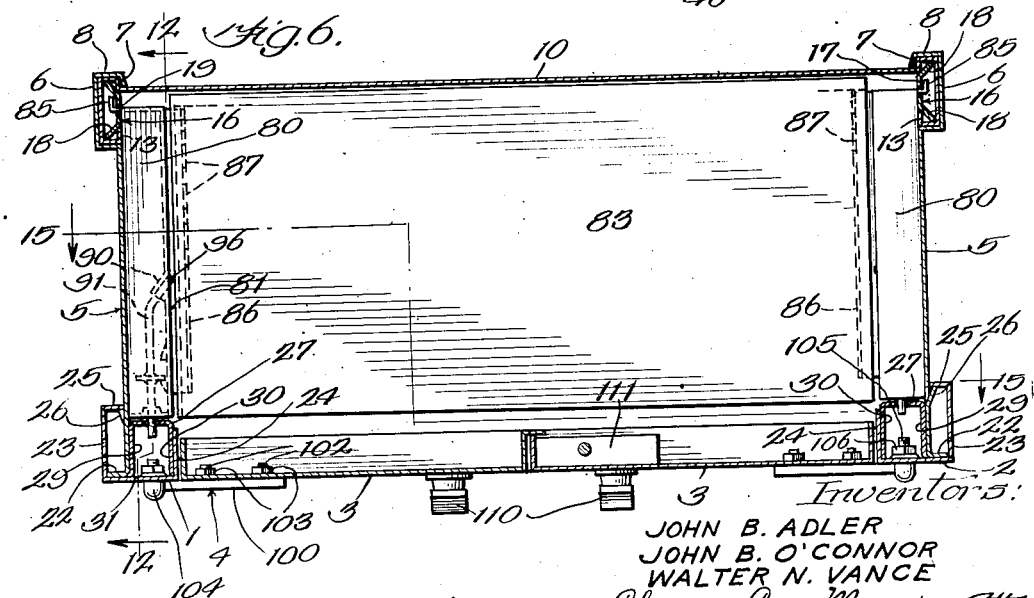
Inventors:
JOHN B. ADLER
JOHN B. O'CONNOR
WALTER N. VANCE March 31, 1931.  W. N. VANCE ET AL  1,798,182
BOLTLESS STRUCTURE
Filed June 20, 1929  6 Sheets-Sheet 3

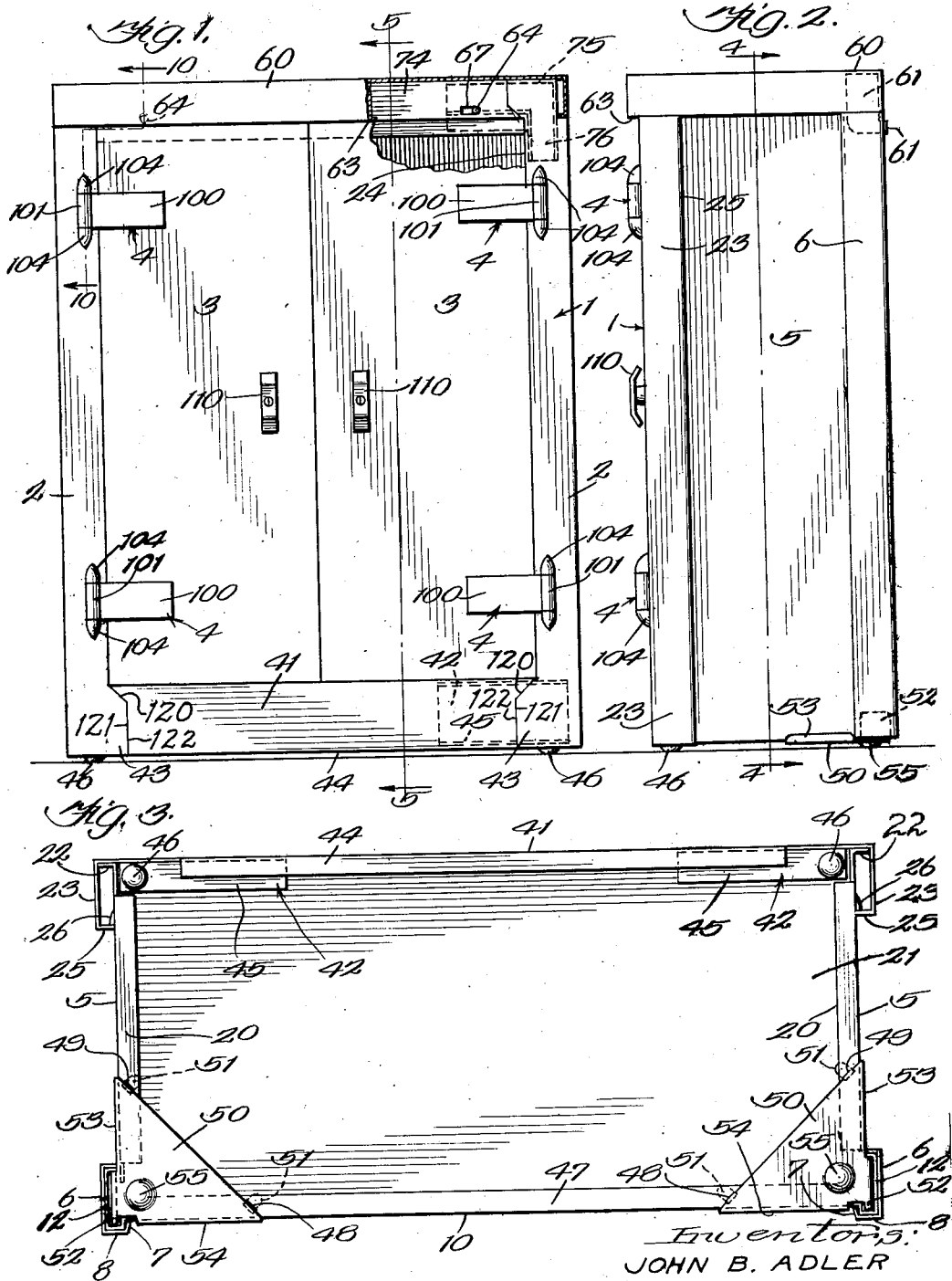

Inventors:
JOHN B. ADLER
JOHN B. O'CONNOR
WALTER N. VANCE
By Cheever, Cox & Moore. Attys.

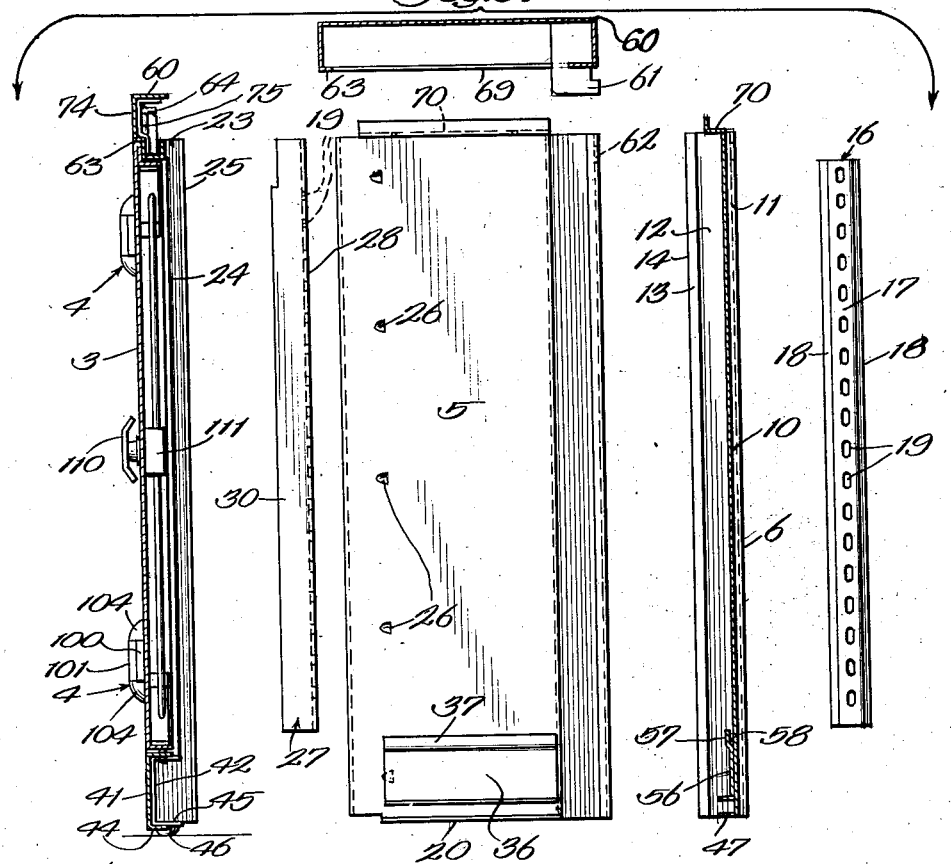
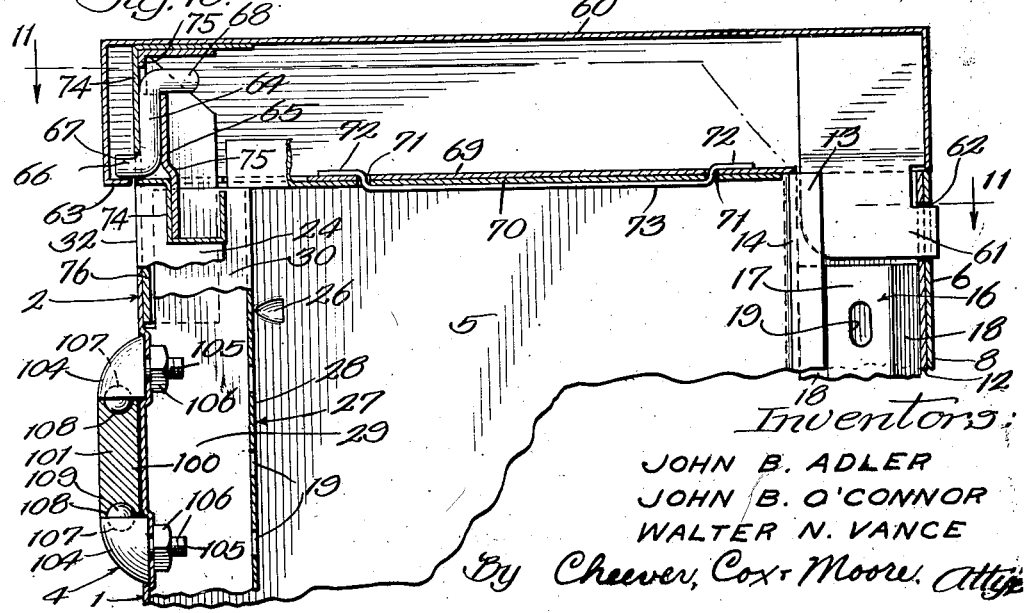

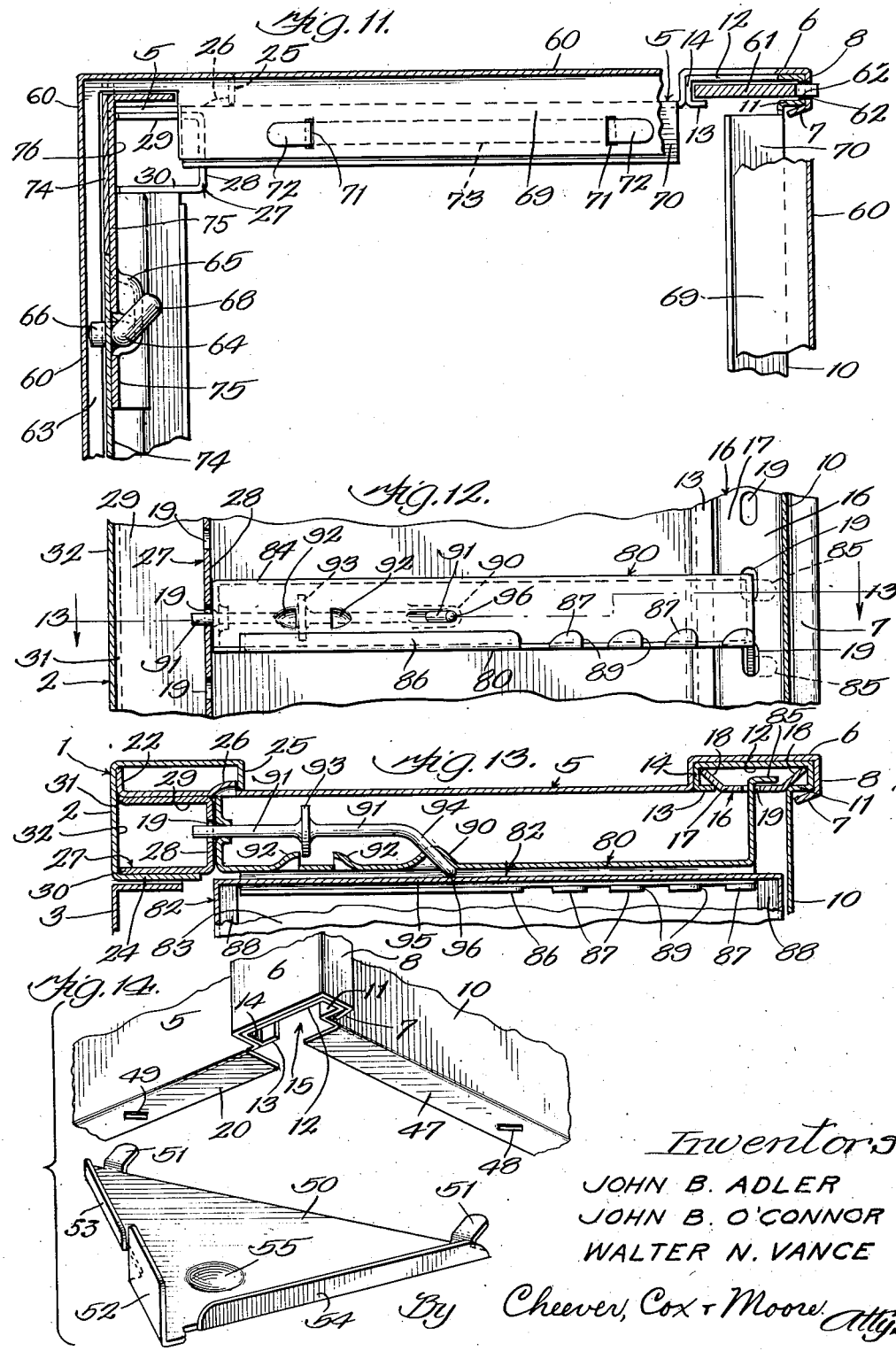

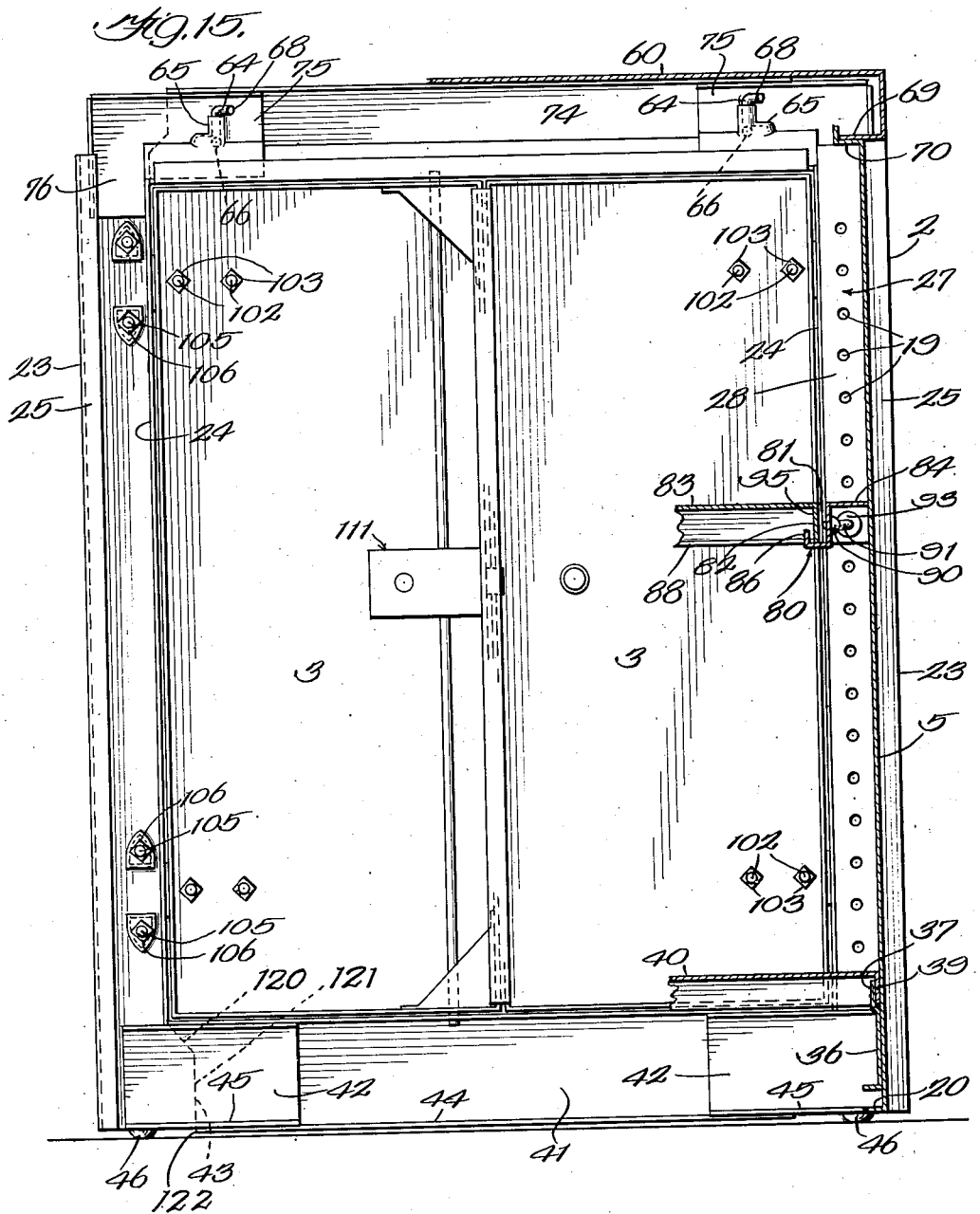

Patented Mar. 31, 1931

1,798,182

UNITED STATES PATENT OFFICE

WALTER N. VANCE, JOHN B. O'CONNOR, AND JOHN B. ADLER, OF AURORA, ILLINOIS, ASSIGNORS TO LYON METAL PRODUCTS, INCORPORATED, OF AURORA, ILLINOIS, A CORPORATION OF ILLINOIS

BOLTLESS STRUCTURE

Application filed June 20, 1929. Serial No. 372,306.

This invention relates in general to cabinets, such as lockers, safes, and the like, which are made of sheet metal or other similar material.

The primary object of the invention is to provide a sheet metal structure, such as a cabinet, whereby the entire cabinet may be erected without the use of a single bolt and still be rigid and self-sustaining.

Another object is to provide a cabinet, or the like, which is provided with interlocking parts so that the cabinet may be readily and quickly erected without the use of tools.

Another object is to provide a boltless structure, which has certain parts which interlock, which presents a neat and finished appearance from the outside thereof, and which cannot be taken down or disassembled from the outside when the cabinet is locked.

Another object is to provide a boltless structure which has a plurality of interengaging and interlocking parts, which must be erected and assembled in a proper predetermined sequence, which must be disassembled in a similar manner, and which can only be disassembled by having access to the interior of the structure.

Another object is to provide a boltless structure which reduces the cost of manufacture and time in erection, which can be readily knocked down and stored away when desired, and which can be quickly and economically assembled by unskilled labor.

Another object is to provide a novel arrangement of parts which will brace the structure, which will retain the parts in assembled position, which is easily accessible, and which has parts thereof which are easily removable therefrom.

Another object is to provide a structure of the class described, which is provided with movable shelves, and which has a main key member for maintaining the parts in assembled position.

Another object is to provide a shelf for a structure, such as cabinets and the like, which cannot be loosened or withdrawn except in a particular manner, and thereby prevent the weight within the structure or cabinet from shifting.

Another object is to provide a new and novel hinge construction, which is fastened to the outer framework and at the front thereof, which operates easily, which is simple and positive in construction, and which can be readily and economically manufactured.

The invention comprises in general a cabinet structure, such as safes, lockers, and the like, which has a front frame to which swinging doors are attached. A front member, a back member, and a pair of sides are provided with novel interlocking members, which are maintained in place by a substantially resilient key member. This key member is provided with a plurality of slots which receive slidable shelves. Braces are provided at the bottom cornice of the structure to reinforce the same and add rigidity thereto. These braces are also provided with a protuberance which provides a rest or bearing for the structure and permits it to be slid about. A top is connected to the front, back, and two side members in a certain manner, and a pin is arranged on the inside of the structure for maintaining the top in place. It is impossible, therefore, to disassemble the structure unless this pin, which holds the top down, is taken out, and this pin, of course, is accessible only from the interior of the cabinet.

The accompanying drawings illustrate a selected embodiment of the invention and the views therein are as follows:

Fig. 1 is a front elevation having parts thereof broken away for the sake of clearness.

Fig. 2 is a side elevation.

Fig. 3 is a bottom plan view.

Fig. 4 is a vertical sectional view on the line 4—4 of Fig. 2.

Fig. 5 is a vertical sectional view on the line 5—5 of Fig. 1 and at right angles to Fig. 4.

Fig. 6 is a horizontal sectional view or plan section.

Fig. 9 is an exploded view of some of the parts shown in Fig. 5.

Fig. 10 is a detail sectional view on the line 10—10 of Fig. 1.

Fig. 11 is a detail sectional view on the line 11—11 of Fig. 10.

Fig. 12 is a detail sectional view on the line 12—12 of Fig. 6.

Fig. 13 is a detail sectional view on the line 13—13 of Fig. 12.

Fig. 14 is a detail perspective view of a bottom corner brace showing the manner in which it is applied to the bottom of the cabinet.

Fig. 15 is a detail sectional view on the line 15—15 of Fig. 6.

Figure 7:
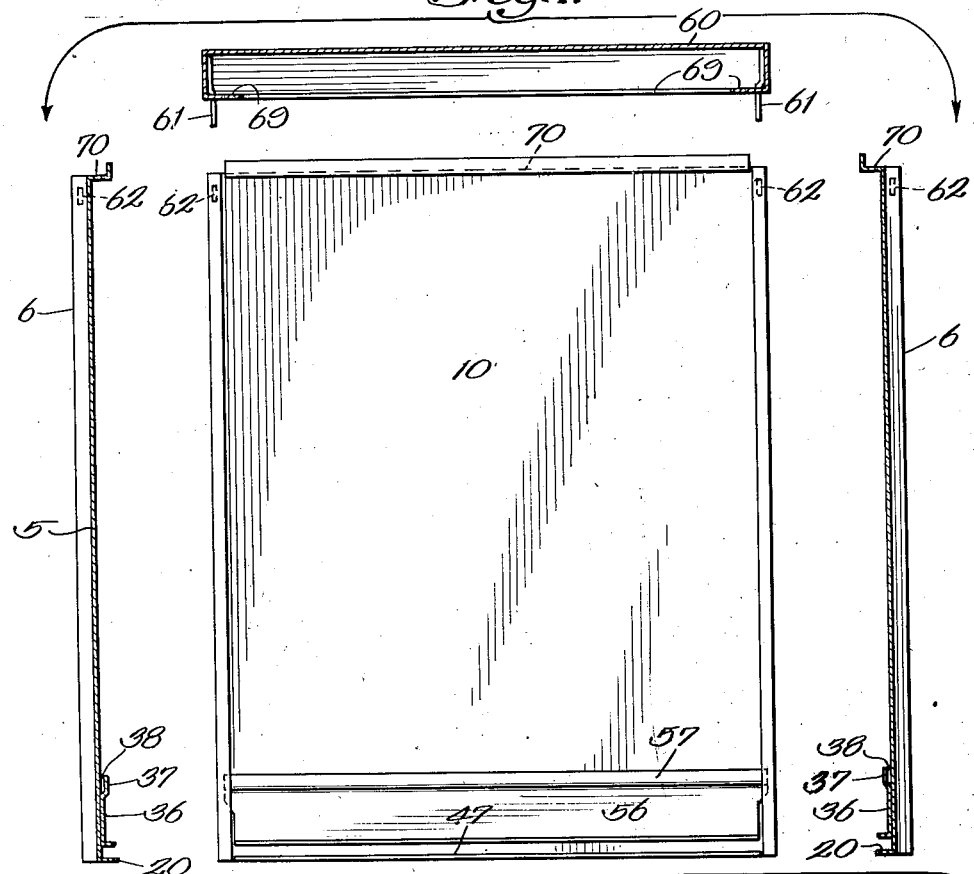
Fig. 7 is an exploded view of some of the parts shown in Fig. 4.

Referring to the drawings, 1 designates a front frame member having a pair of U-shaped upright members 2, upon which a pair of swinging doors 3 are mounted by means of hinges 4. Lock handles are mounted on the doors 3 for operating the doors and locking them in position.

Figure 8:
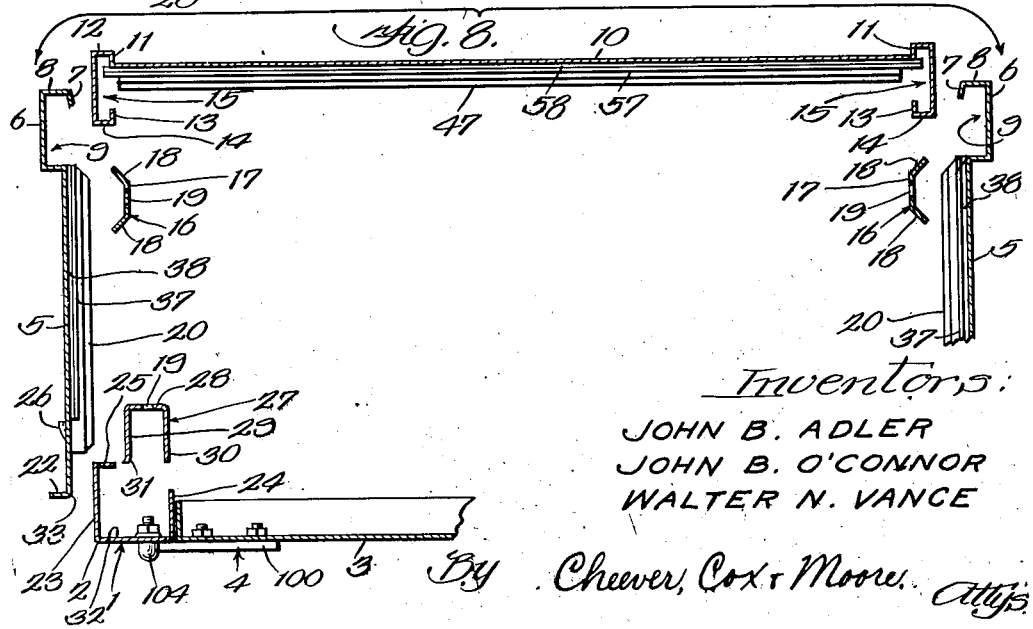
Fig. 8 is a detail exploded view of some of the parts shown in Fig. 6.

Sides 5 are each provided with a substantially U-shaped rear corner portion 6 which is made integral with each side 5. A tongue or lip 7 is bent over on the free leg 8 to provide a substantially rectangular pocket 9, Fig. 8.

A back 10 is bent outwardly to form a leg 11, and then again bent to form a substantially U-shaped portion or member 12, which is substantially the same size as the pocket 9, and this portion 12 is adapted to fit and nest in the pocket. The leg 14 of the member 12 has a part bent over to provide a tongue or lip 13 and assists in forming a pocket 15, Fig. 8. The side members 5 are connected with the back by arranging the member 12 in the pocket 9 so that the member 12 will nest into, and be received by, the pocket. In assembling these parts together, each side member is held at an angle to the member 12 of the back, and then arranged in the pocket so that the tongue 7 on a side will engage a leg 11 on the back. Each side is then pulled in position so that it will be at right angles to the back proper. A vertical resilient or springy key member 16, having a straight portion 17 and a pair of outwardly and angularly disposed legs 18 is slid down and received in the pocket 15. The ends of the legs 18 of this key member bear against the inside corners of the member 12; and the tongue 7 and the corner formed by the leg 11 bear against the sides of the legs 18, Fig. 6. The key member is resilient and causes a pressure to be exerted against the member 12 and tends to force it outwardly against the sides of the pocket 9. This member is provided with a plurality of holes or apertures 19 to receive shelf supports which may be arranged inside of the structure.

Each side 5 is also provided with an inturned flange 20 and assists in supporting the bottom 21. An outturned vertical flange 22 is provided at the forward end of each side and bears against the outer leg 23 of the front U-shaped upright member 2. The outer leg 23 of each upright member 2 is substantially longer than its inner leg 24, and the outer end of leg 23 is bent over to provide a tongue or lip 25. While the upright 2 is substantially U-shaped and has the inturned lip or flange 25 thereon, it is preferable that the entire member be made of one piece of material and bent to the desired shape. The forward end of each side 5 fits into its respective U-shaped front upright member 2 with the flange 22 on the side bearing against the inside of the outer leg 23. A plurality of protuberances 26 are struck outwardly from the sides 5 and are engaged by the tongues 25 of the vertical uprights 2 to assist in holding the parts in position.

Another resilient key member 27, having a body portion 28 and legs 29 and 30, fits into the space between the side 5 and the leg 24 of the upright 2 and tends to spread these parts apart. The flange 22 will be forced against the inside of the upright and the tongue 25 will be forced in position against the protuberances 26. The leg 29 is bent or turned outwardly to provide a rounded nose 31, so that it will snugly engage the inner face 32 of the member 2 and the edge 33 of the side from which the leg 22 projects.

A plate 36, Figs. 7 and 9, is welded to each side 5 at the bottom thereof, and has its upper portion 37 bent away from the side 5 to provide a channel 38 which receives the downturned legs or flanges 39 on the bottom shelf 40.

A front tie member or base 41 connects the two upright members 2 together and overlaps the inwardly projecting channels 42 which are welded to the brace supports 43 on the uprights 2, Figs. 1 and 15. This tie member 41 has an inturned flange 44 which fits over and receives the flange 45 on the channel 42. A part 46 is struck out to provide a protuberance which acts as a foot or support for the front end of the structure.

The back 10 has an inturned flange 47, Figs. 3 and 14, which is provided with slots 48, and the flanges 20 on the sides 5 are also provided with slots 49. A corner brace 50 is provided with a pair of ears 51 which are received in the slots 48 and 49. A tongue 52 extends upwardly from the brace and fits into the pocket 15 to further hold the brace in place. Integral flanges 53 and 54 are provided on the brace 50 and engage the outside of the side 5 and the back 10 respectively. A protuberance 55 is struck out from the brace to provide a foot or support for the rear end of the structure.

The back 10, Figs. 4, 7, and 9, has a plate 56 welded thereon which is similar to the plate 36 which is fastened to the sides 5. The plate 56 has an upper edge 57 which is bent away to provide a pocket or channel 58 which receives the downturned flange 59 formed on the rear of the bottom shelf 40.

A top 60, Fig. 10, is provided with a pair of rearwardly extending tongues 61 which fit into alined slots 62 arranged in the U-shaped members 6 and 12 on the sides and back respectively. An inturned flange 63 is arranged at the front end of the top and receives the fastening pin 64 which is mounted between a cross member 74 and the bent out portion 65 on a reinforcing plate 75. The fastening pin 64 is provided with a turned end 66 which extends through a hole 67 formed in the cross member 74, and this end 66 bears against the inturned edge 63 on the top when the pin is in locked position. A handle portion 68 is provided on the pin 64 so that when the handle 68 is operated, the end 66 of the pin can be moved into or out of the hole 67. The pin is mounted inside of the cabinet and securely locks the top in position. The tongues 61 lock into the slots 62 and hold the rear end of the top in position, and the pin 64 holds the front end of the top in locked position. The parts as so far assembled are maintained in rigid position and cannot be disassembled unless the top is removed first. Inasmuch as the top cannot be removed, except by withdrawing the pin 64, which is arranged inside of the structure, the structure can only be disassembled by having access to the interior of the structure. Therefore, when the doors 3 are locked, it is impossible to gain access to the interior of the structure to disassemble it. The top is also provided with a continuous inturned flange 69 which rests against an inturned flange 70 extending around the inside of the sides, front, and back of the structure. Alined holes 71 are provided in these flanges and receive the ends 72 of the fastener 73. The fastener 73 is preferably the type disclosed and claimed in the co-pending application of James E. Bales, Serial No. 308,605, filed September 27, 1928.

The front upright members 2 are connected at the top by the cross member 74 which has the reinforcing plates 75 welded thereto. These plates have a leg 76 formed thereon which extends down along the side of the uprights and is welded thereto. These plates are arranged behind the top when the top is arranged in position.

Shelf supports 80 are substantially Z-shaped and have a channel 81 provided therein, into which the downturned legs or flanges 82 of the shelves 83 slide. A top connecting portion 84 is made integral with the body of the support and it has inturned ends or legs 85, Figs. 12 and 13, which are received in the slots 19 of the member 16. The leg 86 of the shelf supports 80 is notched at intervals to provide a plurality of upstanding ears 87. As the shelf 83 is pushed in position, Fig. 5, the rear turned end 88 on the shelf will engage the perpendicular edge 89 on the ears 87, Figs. 12 and 13, and prevent the shelf from being slid out, unless it is lifted at its rear end. It is easily slid in position, however, because the front ends of the ears 87 are rounded. The shelf support 80 has a struck out perforated portion 90 at the side thereof, through which one end of a sliding pin 91 extends. A pair of ears 92 are also struck up from the side of the support and are adapted to be engaged by a thumb piece 93 on the pin 91 and restrict the movement of the bolt. The opposite end of the pin 91 extends through a hole in the end of the support and is adapted to enter one of the holes 19 in the member 27. The rear ends of the brackets are thus supported by the legs 85 engaging the holes in the member 16, while the front end of the brackets are supported by pin 91 extending in the holes 19 in the member 27. Due to the bent end 94 of the pin which extends through the struck up portion 90 of the support, the pin is prevented from becoming dislodged from its operative position on the support. The pin is only operated when the shelf is not in place as the side flange 95 of the shelf contacts with the end 96 of the pin and prevents the pin from becoming loose or being operated when the shelf is in place.

Handles 110 are provided on the doors 3 to operate the locking mechanism 111, Figs. 1, 3, and 9.

The invention provides a structure, which can be erected at a very low cost, has all the parts nest or mate in a particular manner and interlock with each other. The parts are comparatively simple and can be erected and assembled by unskilled labor. The entire structure must be assembled in proper sequence and in order to knock down the structure, it must be disassembled in opposite sequence from which it is assembled. The shelves are slid in position and are supported by novel brackets which engage the keys in the corner members of the structure. These brackets may be set in one of the holes in the key members, and are securely locked in position when the shelves are arranged in the structure and tend to support and brace the structure as a whole and prevent it from racking.

The doors 3 are held in position by means of hinges 4, Figs. 10, 15, which comprise a strap portion 100 which has a thickened or enlarged outer end 101. These straps are provided with threaded lugs 102, which extend through holes in the door and are held thereon by means of nuts 103. Caps 104 are provided with inwardly extending lugs or bolts 105, which are threaded and extend into the inside of the front corner members and are held in position by means of nuts 106. These headers are each provided with a substantially semi-spherical hole 107 which corresponds with semi-spherical holes 108 in the part 101 of the strap. Ball bearings 109 fit into these semi-spherical holes and when the parts are in operative position, provide a ball bearing hinge of simple and novel construction.

In practice, the strap is applied to the door and a lower header 104 is fastened to the jamb. A ball is inserted in the groove in this header and fits into the lower groove or recess in the strap. Another ball is then put in the upper groove in the strap, and the upper header 104 is applied in position to completely assemble the hinge. The hinge is comparatively simple in construction, is very easily operated, and can be readily and economically manufactured.

Each upright 2, Figs. 1 and 15, is provided with a beveled edge 120 which merges with a straight front edge 121 and provides the inwardly extending portion 43, which is integral with the uprights 2.

The front finishing member or base 41 is provided with the integral flange 44, and it has its outer edge 122, Fig. 15, abutting the straight edge 44.

The channel 42 is arranged on the back of the base 41 and extends across the portion 43 and on a main part of the upright 2. This channel is welded in position on these members and securely and rigidly braces the parts and prevents racking of the structure at this point. The greater stresses and strains occur at the intersection of the inside edge of the upright and the top edge of the base 41. The beveled edge 120 prevents a sharp joint from occurring at this intersection, and the extension 43 provides a substantially wide surface to which the channel 42 is welded. If the joint were made at a point in line with the inside edge of the upright the structure would not be nearly so strong.

The improved joint or connection provides a rigid and strong connection between the members which could not be obtained without the beveled edge 120 and the extension 43. The flanges 45 on the channel 42 rest on the flanges 44 on the base 41 to further strengthen the joint and keep the structure from racking.

The entire structure is rigid, is substantially braced throughout, and access to the interior thereof can only be had through the doors, so when the doors are locked, access to the interior thereof is prohibited. The structure can be easily knocked down, and when knocked down requires very little space.

Changes may be made in the form construction, and arrangement of the parts without departing from the spirit of the invention or sacrificing any of the advantages thereof, and the right is hereby reserved to make all such changes as fairly fall within the scope of the following claims.

We claim:

1. A boltless structure comprising front uprights, side members interfitting with said uprights and forming corners, a back interlocking with said side members and forming corners, and key members arranged in the corners of said structure and holding the parts in position.

2. A boltless structure comprising front uprights, side members interfitting with said uprights and forming corners, a back interlocking with said side members and forming corners, key members holding the uprights, side and back together, and doors hinged to said front uprights.

3. A boltless structure comprising front uprights, side members interfitting with said uprights and forming corners, a back interlocking with said side members and forming corners, key members arranged in the corners of said structure and holding the parts in position, and a top connected to said side members and said back and having a part thereof extending over said sides and said front uprights.

4. A boltless structure comprising front uprights, side members interfitting with said uprights and forming corners, a back interlocking with said side members and forming corners, key members arranged in the corners of said structure and holding the parts in position, a top connected to said side members and said back and having a part thereof extending over said sides and said front uprights, and means arranged in said structure and engaging a part of said top to prevent removal of said top when said means engages said top.

5. A boltless structure comprising front uprights, side members interfitting with said uprights and forming corners, a back interlocking with said side members and forming corners, key members arranged in the corners of said structure and holding the parts in position, a top connected to said side members and said back and having a part thereof extending over said sides and said front uprights, a pin slidable in a part on the inside of said structure and engageable with said top for locking said top in position, and a bottom mounted on said sides and back.

6. A boltless structure comprising front uprights, side members interfitting with said uprights and forming corners, a back interlocking with said side members and forming corners, key members arranged in the corners of said structure and holding the parts in position, a top connected to said side members and said back and having a part thereof extending over said sides and said front uprights, a pin slidable in a part on the inside of said structure and engageable with said top for locking said top in position, a bottom mounted on said sides and back, corner braces interlocking with said side members and said back, and a protuberance struck out from said corner members and forming a foot.

7. A boltless structure comprising front uprights, side members interfitting with said uprights and forming corners, a back interlocking with said side members and forming corners, key members arranged in the corners of said structure and holding the parts in position, a top and a bottom interlocking with said sides and back, and shelf supports engaging said key members.

8. A boltless structure comprising front uprights, side members interfitting with said uprights and forming corners, a back interlocking with said side members and forming corners, key members having holes therein and arranged in the corners of said structure for holding said parts in position, shelf supports, means on said shelf supports and engaging said holes, and shelves removably mounted on said supports.

9. A boltless structure comprising front uprights, side members interfitting with said uprights and forming corners, a back interlocking with said side members and forming corners, key members having holes therein and arranged in the corners of said structure for holding said parts in position, shelf supports, means on said shelf supports and engaging said holes, shelves removably mounted on said supports, doors hinged to said uprights, and means for preventing removal of said top from the outside of said structure.

10. A boltless structure comprising a front, a back and two sides, interengaging means on said back and said sides, interengaging means on said front and said sides, longitudinal slidable key members bracing some of said parts and keeping them in interengaged position, a top engageable with the front, back and sides, and a bottom for said structure.

11. A boltless structure comprising a front, a back and two sides, interengaging means on said back and said sides, interengaging means on said front and said sides, slidably arranged key members bracing some of said parts and keeping them in interengaged position, a top engageable with the front, back and sides, a bottom for said structure, shelf supports carried by said key members, and shelves carried by said supports.

12. A boltless structure comprising a front, a back and two sides, interengaging means on said back and said sides, interengaging means on said front and said sides, substantially resilient key members for expanding some of said parts for bracing said parts and keeping them in interengaged position, a top engageable with the front, back and sides, a bottom for said structure, and means arranged inside of said structure and engaging said top to prevent said parts from being disassembled.

13. A boltless structure having a plurality of interengaging parts, one of said parts constituting a master part, a slidable pin mounted on another of said parts and engageable with said master part for holding said parts in position, said slidable pin being arranged in the interior of said structure, whereby said master part cannot be removed to disassemble the structure unless the slidable pin is operated from the inside.

14. A boltless structure having a plurality of interengaging parts and comprising front uprights and an interfitting removable top, said top constituting a master part, a pin slidably mounted on one of said parts and engageable with said top for holding said top master part in locked position, said pin being accessible only from the interior of said structure, doors hinged to said uprights, and means for locking said doors in position to prevent access to said sliding pin when said doors are locked in position.

15. A structure having flanged back and side walls and forming corners, a corner brace for said structure and comprising a tongue extending upwardly in the corners thereof, said flanges having holes therein, projections on said brace and engaging the holes, and a protuberance on said brace and forming a foot or support for said structure.

16. In a structure of the class described, a frame therefor and comprising an upright, an inwardly extending projection on said upright, a base having its ends abutting said projection and forming a joint, a plate extending across said joint and fixed to said base, projection, and to a part of said upright, said projection having an inclined or beveled edge which extends from the inside edge of the upright to the inside edge of the projection.

17. In a structure of the class described, a frame therefor and comprising an upright, an inwardly extending projection on said upright, a base having inturned flanges and having its outer end abutting the inner edge of said projection, said projection being integral with said upright and having an inclined upper edge, and a channel supported by said flanges and fixed to said base, projection and upright, and located below said beveled edge to reinforce the upright and the base.

18. In a structure of the class described comprising two sides and a back, key members having holes therein holding said sides and back together, a horizontal shelf support, legs on said support and engaging said holes for holding said support in position, shelves arranged on said support, and slidable means on said horizontal shelf support and engaging said shelf for maintaining said shelf in position.

19. In a structure of the class described comprising a shelf support, means for adjustably and removably maintaining said support in position, a shelf having sliding engagement with said shelf support, and means on said support and engaging said shelf and preventing outward sliding movement of said shelf for a certain distance.

20. A structure having a plurality of interfitting parts and comprising a top, bottom, sides, and a back, a closure for said structure, one of said parts comprising a master part for holding the structure together and preventing disassembling of said structure without first removing said master part, locking means accessible only from the interior of said structure and engageable with said part, and means for locking said closure to prevent access to the interior of said structure, whereby said structure cannot be disassembled without first unlocking said closure and gaining access to the interior of the structure to disengage said locking means from said part.

In witness whereof, I have hereunto subscribed my name.

WALTER N. VANCE.

In witness whereof, I have hereunto subscribed my name.

JOHN B. O'CONNOR.

In witness whereof, I have hereunto subscribed my name.

JOHN B. ADLER.